(12) United States Patent
    Masters et al.

(10) Patent No.: US 9,052,188 B2
(45) Date of Patent: Jun. 9, 2015

(54) MEASUREMENT DEVICE

(71) Applicant: No Nonsense Innovations Limited, Stockport (GB)

(72) Inventors: Roy Masters, Stockport (GB); Christopher Mark Pedley, Stockport (GB); Paul Addy, Stockport (GB); Tim Hazelhurst, Stockport (GB); David Vis, Stockport (GB)

(73) Assignee: NO NONSENSE INNOVTIONS LTD., Stockport (GB)

( * ) Notice: Subject to any disclaimer, the term of this patent is extended or adjusted under 35 U.S.C. 154(b) by 148 days.

(21) Appl. No.: 13/834,928

(22) Filed: Mar. 15, 2013

(65) Prior Publication Data
    US 2013/0340269 A1    Dec. 26, 2013

(51) Int. Cl.
    *G01C 9/24*     (2006.01)
    *G01B 13/18*    (2006.01)
    *G01C 9/10*     (2006.01)

(52) U.S. Cl.
    CPC  *G01B 13/18* (2013.01); *G01C 9/10* (2013.01); *G01C 9/24* (2013.01)

(58) Field of Classification Search
    CPC ........ G01C 15/00; G01C 9/24; G01C 15/004; G01C 9/06; G01C 9/26; G01C 9/28; G01C 15/06; G01C 21/20; G01C 9/10
    USPC ............................................. 33/343, 371, 379
    See application file for complete search history.

(56) References Cited

U.S. PATENT DOCUMENTS

| | | | |
|---|---|---|---|
| 3,168,831 A * | 2/1965 | Wagner ........................... 73/492 |
| 6,691,421 B2 * | 2/2004 | Roth et al. ...................... 33/379 |
| 2007/0220765 A1 * | 9/2007 | Montgomery .................. 33/451 |
| 2009/0158605 A1 * | 6/2009 | Montgomery .................. 33/379 |
| 2013/0340269 A1 * | 12/2013 | Masters et al. .................. 33/343 |

* cited by examiner

*Primary Examiner* — Yaritza Guadalupe-McCall
(74) *Attorney, Agent, or Firm* — Adam Warwick Bell; Matthew Rupert Kaser

(57) ABSTRACT

A measurement device comprising a curved container containing a liquid, a first indicator that is less dense than the liquid, and a second indicator that is more dense than the liquid, where the liquid substantially fills the container so that the position of the first indicator and/or second indicator in the container relative to the reference indicia may indicate an angle-related property of the device.

13 Claims, 2 Drawing Sheets

MEASUREMENT DEVICE

RELATIONSHIP TO OTHER APPLICATIONS

The present application claims the benefit of and priority to UK application GB1210918.7 filed 20 Jun. 2012, which is hereby incorporated by reference.

FIELD OF THE INVENTION

This invention relates to a measurement device, and more particularly to a measurement device for measuring angle-related properties determined by the orientation of the device.

BACKGROUND

There are various known methods of measuring the inclination of surfaces which include optical measurement tools and complicated measurement tools.

One of the simplest tools for measuring the inclination of a surface is the spirit level (sometimes known as a bubble level). A spirit level device typically includes a longitudinal container which contains a liquid and a "bubble" of a material having a lower density than the surrounding liquid. Due to the relative densities of the bubble and the surrounding liquid, the bubble always tends to rise relative to the liquid, in accordance with Archimedes' principle, to its highest local point relative to the gravitational vertical axis as determined by the confines of the container. Therefore, if there is any inclination in the longitudinal container, the buoyant forces acting on the bubble cause it to rise in the liquid towards its highest gravitational point permitted by the container. Thus, a user will be able to determine whether the surface that the spirit level is resting on or held against has an inclination or not by the behavior of the bubble. The spirit level may include reference lines to assist the user in monitoring the position and any movement of the bubble.

The spirit level is therefore a very simple, yet effective, device for indicating the presence of an inclination. However, a spirit level such as the one described above is incapable of indicating the extent of the inclination beyond the horizontal plane and is therefore of limited use when more detailed and specific information is required.

It is an object of the present invention to provide a measurement device that is capable of indicating that a surface has an inclination and that is additionally capable of providing more specific angle-related information about the extent of the inclination.

BRIEF SUMMARY OF THE DISCLOSURE

General Representations Concerning the Disclosure

This specification incorporates by reference to the fullest extent allowable by law all documents referred to herein and all documents filed concurrently with this specification or filed previously in connection with this application, including but not limited to such documents which are open to public inspection with this specification.

In this specification, reference is made to particular features of the invention. It is to be understood that the disclosure of the invention in this specification includes all appropriate combinations of such particular features. For example, where a particular feature is disclosed in the context of a particular embodiment or a particular claim, that feature can also be used, to the extent appropriate, in the context of other particular embodiments and claims, and in the invention generally.

The embodiments disclosed in this specification are exemplary and do not limit the invention. Other embodiments can be utilized and changes can be made. As used in this specification, the singular forms "a", "an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. Where reference is made in this specification to a method comprising two or more defined steps, the defined steps can be carried out in any order or simultaneously, and the method can optionally include one or more other steps which are carried out before any of the defined steps, between two of the defined steps, or after all the defined steps. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility).

In accordance with a first aspect of the present invention there is provided a measurement device comprising:

a curved container containing a liquid, a first indicator that is less dense than the liquid, and a second indicator that is more dense than the liquid, where the liquid substantially fills the container;

wherein the first indicator is free to move in the liquid to its highest local point relative to the gravitational vertical axis as determined by the confines of the container, and the second indicator is free to move in the liquid towards its lowest local point relative to the gravitational vertical axis as determined by the confines of the container; and wherein the measurement device further comprises reference indicia arranged relative to the container so that the position of the first indicator and/or second indicator in the container relative to the reference indicia may indicate an angle-related property of the device.

Given that the first indicator is less dense than the liquid, its movement to its highest local point (relative to the gravitational vertical axis) will be caused by the upward buoyant forces acting on the first indicator exceeding the downward gravitational forces. Conversely, given that the second indicator is denser than the liquid, its movement to its lowest local point (relative to the gravitational vertical axis) will be caused by the downward gravitational forces exceeding the upward buoyant forces acting on the second indicator.

In one preferable embodiment, the curved container follows a circular path, wherein the circular path preferably extends along an arc subtending an angle greater than 180°. Additionally or alternatively, the circular path extends along an arc subtending an angle less than 360°. In one preferable embodiment, the circular path extends along an arc subtending an angle between 180° and 200°.

The measurement device may further comprise a frame wherein the curved container is attachable to the frame. In one embodiment, the reference indicia are arranged on the frame. The frame and the reference indicia may be arranged so that the reference indicia are viewable from an angle that is substantially along the plane of the container.

The curved container may be attachable to the frame by a snap fit arrangement.

In one preferable embodiment, the first indicator is a gas. Additionally or alternatively, the second indicator is a solid.

In accordance with a second aspect of the present invention there is provided a kit comprising:

a curved container containing a liquid, a first indicator that is less dense than the liquid, and a second indicator that is more dense than the liquid, where the liquid substantially fills the container, wherein the first indicator is free to move in the liquid to its highest local point relative to the gravitational vertical axis as determined by the confines of the container, and the second indicator is free to move in the liquid towards its lowest local point relative to the gravitational vertical axis as determined by the confines of the container; and a plurality of frames, wherein the container is removably attachable to each of the plurality of frames;

wherein each of the plurality of frames includes reference indicia so that when each of the frames is individually attached to curved container, the reference indicia are arranged relative to the container so that the position of the first indicator and/or second indicator in the container relative the reference indicia may indicate an angle-related property of the container.

BRIEF DESCRIPTION OF THE DRAWINGS

Embodiments of the invention are further described hereinafter with reference to the accompanying drawings, in which.

DETAILED DESCRIPTION

Figure 1:
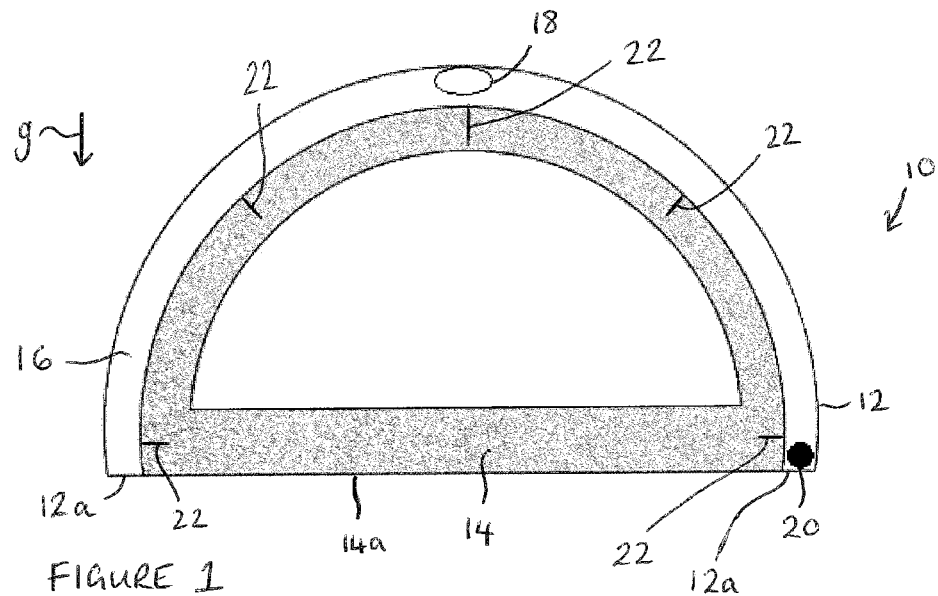
FIG. 1 is a side view of a measurement device according to an embodiment of the present invention.

FIG. 1 shows a measurement device 10 in accordance with an embodiment of the present invention. The measurement device 10 includes a curved container 12 that follows a circular path. The container 12 is attached to a frame 14 that provides structural rigidity to the device 10 and provides a more substantial structure for a user to handle. Additionally, the frame 14 has a flat edge 14a that is flush with flat ends 12a of the container 12. The flat edge 14a and flat ends 12a of the container 12 lie along a chord of the notional circle about whose circumference the container 12 extends.

The container 12 contains a liquid 16 that fills almost all of the internal volume of the container 12. Additionally, the container includes a first indicator 18 that is less dense than the liquid 16, and a second indicator 20 that is denser than the liquid 16. The first indicator 18 and second indicator 20 have relatively small volumes that are much smaller than the volume of the liquid 16. In one example, the first indicator 18 is a liquid that is less dense than the surrounding liquid 16. In an alternative example, the first indicator 18 is a gas that is less dense than the surrounding liquid 16. Similarly, in one example, the second indicator 20 is a liquid that is denser than the surrounding liquid 16. In an alternative example, the second indicator 20 is a solid that is denser than the surrounding liquid 16, such as a metallic ball. The first indicator 18 and second indicator 18 move in the container 12 relative to the liquid 16 according to gravitational and buoyant forces. The first indicator 18 and second indicator 20 may be chosen to have low frictional resistance when moving through the liquid 16. The liquid 16 may be coloured to assist visibility of the first indicator 18 and/or second indicator 20.

Thus, the first indicator 18 tends to move towards its highest local point in the container 12 as the first indicator 18 experiences an upward buoyant force in the liquid 16 that is greater than the downward gravitational force acting on the mass of the first indicator 18. In this context, the relative terms "higher" and "lower" and the like are considered to be relative to the gravitational vertical axis. Throughout this application, therefore, the terms highest/lowest local/global gravitational point are used to indicate points relative to the gravitational vertical axis (i.e. the line along which gravity acts) regardless of whether the downward gravitational force or upward buoyant force is dominant. The skilled reader will appreciate that the word "local" is used in the term "highest local gravitational point" to indicate that the highest point reachable by the first indicator 18 in the container 12 may not be the highest (global) point of the container 12, as is described in more detail below.

Similarly, the second indicator 20 tends to move towards its lowest local gravitational point in the container 12 as the second indicator 20 experiences a downward gravitational force that is greater than the upward buoyant force in the liquid 16. Again, the skilled reader will appreciate that the word "local" is used in the term "lowest local gravitational point" to indicate that the lowest point reachable by the second indicator 20 in the container 12 may not be the lowest (global) point of the container 12, as is described in more detail below.

In each of FIGS. 1 to 4, the direction g indicates the downward line along which gravity acts on the device 10 and its components. That is, direction g is parallel to the gravitational vertical axis referred to above.

The container 12 is configured so that the first indicator 18 and second indicator 20 are viewable through at least a portion of the container 12. Additionally, the container 12 is sealed (but not necessarily irreversibly so) so as to prevent the liquid 16, first indicator 18 and second indicator 20 from exiting the container 12. The container 12 may be a vial and/or may be made from any one or more of glass, Perspex, PVC, or other suitable material. In one embodiment, the container 12 is made of a semi-rigid or flexible plastics material.

Considering the measurement device 10 in the orientation shown in FIG. 1, where the flat ends 12a of the container 12 and the flat edge 14a of the frame 14 are disposed horizontally (i.e. perpendicularly to direction g) and the flat ends 12a are beneath the remainder of the container 12, the first indicator 18 is positioned at its highest local gravitational point in the container 12. Indeed, in the orientation shown in FIG. 1, the first indicator 18 is also in the highest global gravitational point within the container 12, since no part of the internal volume of the container 12 is higher than the point where the first indicator 18 is disposed. The highest local gravitational point and the highest global gravitational point for the first indicator 18 will be coincident for orientations within +/−90° of the orientation shown in FIG. 1 (rotated about a point at the center of the notional circle about whose circumference the container 12 extends along).

The measurement device 10 includes reference indicia 22 which may include markings, graduations, symbols or other indicia for indicating an angle-related property of the device 10. In use, the user may deduce the angle-related property of the device 10 by assessing the position of the first indicator 18 or second indicator 20 relative to the reference indicia 22. For example, in the orientation shown in FIG. 1, the position of the first indicator 18 relative to the reference indicia 22 may indicate that the measurement device 10 is orientated horizontally. More particularly, if the measurement device 10 of FIG. 1 is disposed with the flat edge 14a of the frame 14 and the flat ends 12a of the container 12 disposed on a surface, the position of the first indicator 18 relative to the reference indicia 22 may indicate that the surface is horizontal.

The first indicator 18 is configured to indicate (by reference to its position relative to the reference indicia 22) an angle-related property of the measurement device 10 within +/−90° of the orientation shown in FIG. 1. Beyond +/−90° of the orientation of FIG. 1, the highest local gravitational point of the first indicator 18 will be towards one of the ends 12a of the container 12 and will be unchanging such that the usefulness of information provided by the first indicator 18 is limited. Instead, at orientations beyond +/−90° of the orientation of FIG. 1, the position of the second indicator 20 relative to the reference indicia is used to provide an indication of an angle-related property of the device 10. Indeed, at these orientations, the lowest local gravitational point of the second indicator 20 is coincident with the lowest global gravitational point for the second indicator 20 within the container 12, since no point of the container 12 is lower than where the second indicator 20 is disposed.

Figure 3:
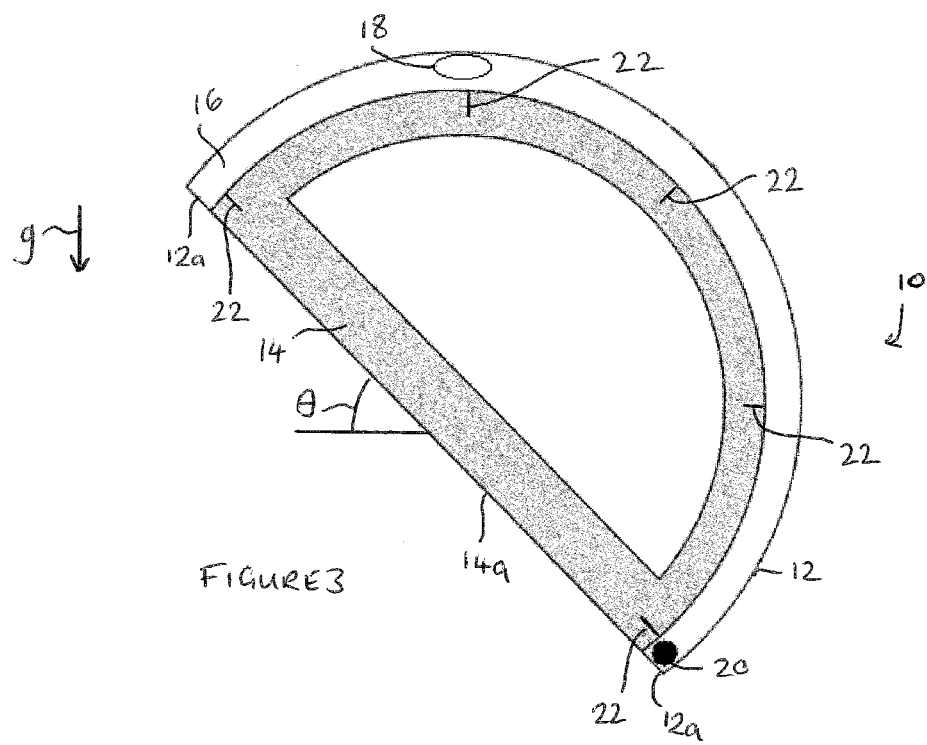
FIG. 3 is a side view of the measurement device of FIG. 1 rotated θ° clockwise.

FIG. 3 shows the measurement device 10 in an orientation that is rotated θ° relative to the orientation shown in FIG. 1. In use, this may be because the device 10 is positioned on a surface that is angled θ° from the horizontal. The first indicator 18 has moved relative to its position shown in FIG. 1 to its new highest local (and global) gravitational point. The position of the first indicator 18 relative to the reference indicia 22 may be used to indicate an angle-related property of the device 10. For example, the reference indicium 22 proximate the first indicator 18 may be labeled θ° to explicitly indicate the orientation of the device 10 or the inclination of a surface on which the device 10 is disposed, where θ is the angle corresponding to the inclination of the device 10.

Figure 2:
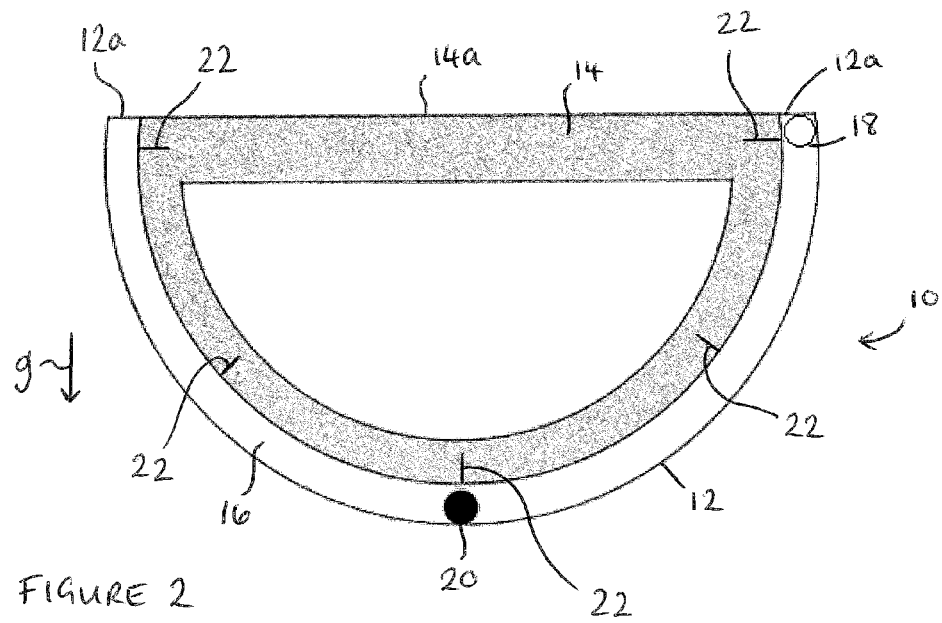
FIG. 2 is a side view of the measurement device of FIG. 1 rotated 180°.
Figure 4:
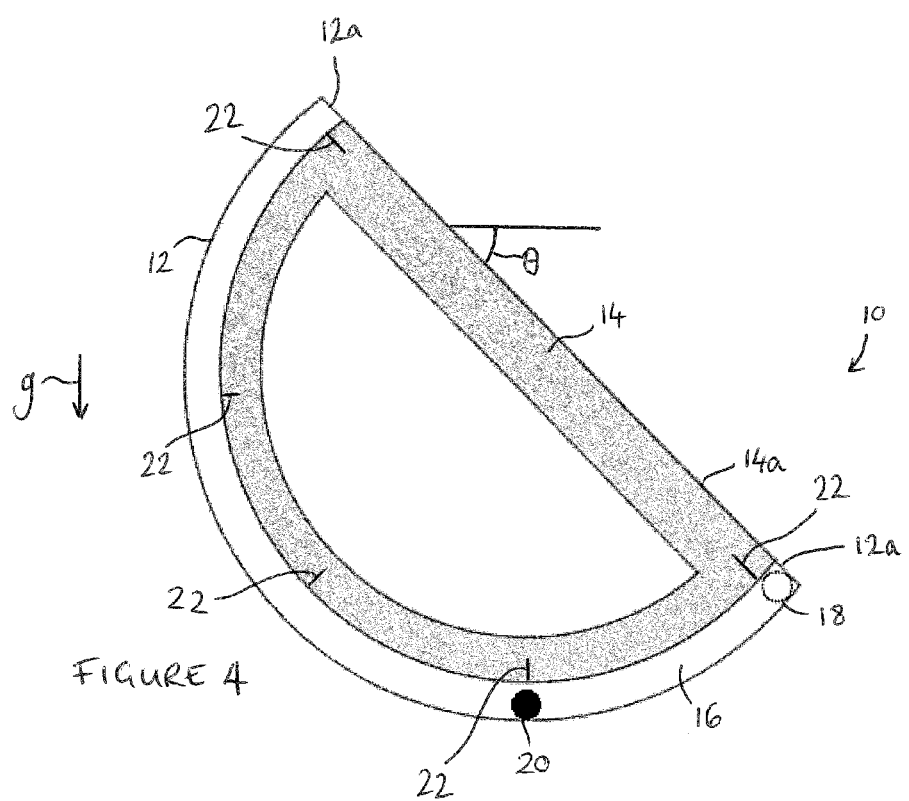
FIG. 4 is a side view of the measurement device of FIG. 2 rotated a further θ° clockwise.

Similarly, in FIG. 4 the device 10 is orientated at θ° relative to the orientation shown in FIG. 2. In this orientation, the second indicator 20 is the actively useful indicator (of the two indicators 18,20) and travels under the influence of gravity to its lowest local (and global) gravitational point. The position of the second indicator 20 relative to the reference indicia 22 may be used to indicate an angle-related property of the device 10. For example, the reference indicium 22 proximate the second indicator 20 may be labeled θ° to explicitly indicate the orientation of the device 10 or the inclination of a surface on which the device 10 is disposed, where θ is the angle corresponding to the inclination of the device 10.

It should be noted that in the orientation shown in FIG. 4, the first indicator 18 is at its highest local gravitational point but this is not coincident with the highest global gravitational point as there are parts of the container 12 that are disposed higher than the first indicator 18. However, the first indicator 18 must first travel downwards (gravitationally) in order to reach the highest global gravitational point. Since the first indicator 18 is unable to do this under the influence of buoyancy and gravity alone, the first indicator 18 remains "trapped" at its highest local gravitational point. Nevertheless, the first indicator 18 is redundant in this orientation and the "active" second indicator 20 provides useful information to the user by virtue of its position relative to the reference indicia 22.

As demonstrated by the examples described above with reference to FIGS. 1 to 4, the measurement device 10 of the present invention may be used to measure or indicate angle-related properties of the device 10 (or a surface to which the device 10 is aligned). The measurement device 10 may be used in any orientation within a substantially vertical plane, where either the first indicator 18 or the second indicator 20 is active in providing useful information depending on the orientation of the device 10. When the measurement device 10 is used to measure angle-related properties of a surface, the first indicator 18 is active when measuring the upper side of the surface (such as a table-top, for example), and the second indicator 20 is active when measuring the under side of the surface (such as a ceiling, for example). Thus, the measurement device 10 is capable of measuring through 360°.

The reference indicia 22 may be chosen to provide information to the user in respect of various angle-related properties, such as, but not limited to, scales, graduations, degrees, and key gradient indicators. For example, the reference indicia 22 may indicate absolute angles (in units such as degrees or radians) in relation to the vertical or horizontal. Alternatively, the reference indicia 22 may indicate a gradient quantity. In a further alternative embodiment, the reference indicia 22 may indicate a descriptive property indicating a region of ideal or acceptable angles. In particular, for a specific application, the reference indicia 22 could include labels such as "Too Steep", "Too Shallow", and "Acceptable", or similar, or could have coloured or otherwise distinguishable regions indicating various angle-related properties. The skilled reader will appreciate that any suitable angle-related reference indicia 22 may be used within the scope of the present invention and that the reference indicia 22 may be customized for specific applications of the measurement device 10.

In one preferable embodiment, the container 12 is attachable to the frame 14 by a snap fit arrangement or the container 12 may be inserted into the frame 14. The container 12 is preferably removably attachable to the frame 14. In one particularly preferable embodiment, the container 12 is provided as part of a kit with one or more frames 14 where the frames 14 may have different reference indicia 22 for various different applications. The container 12 may then be attached to any of the frames 14 for the desired application.

The reference indicia 22 may be on the frame 14. However, in alternative embodiments, the measurement device 10 may not include a frame 14 and/or may have the reference indicia 22 on the container 12 itself. The reference indicia 22 may be etched, painted or otherwise marked on the frame 14 or the container 12. The reference indicia 22 may be disposed on the more radially inward part of the container 12 in which case the curvature of the container 12 may provide a magnifying effect when the reference indicia 22 are viewed from a more radially outward position. In another embodiment, the reference indicia 22 may be disposed on the more radially outward part of the container 12. This arrangement may avoid optical distortion since the reference indicia 22 do not need to be viewed through the container 12 (and hence liquid 16). Hence, it may be the case that the accuracy of the device may be optimized.

In one particularly preferable embodiment, the reference indicia 22 are viewable from an angle that is substantially along the plane of the container 12 so that a user using the device 10 in a vertical plane (as is intended) and viewing the device 10 from a position directly vertically above or below the device 10 is able to easily determine the angle-related property of interest. To achieve this, the reference indicia 22 could be disposed on the container 12 so that they are viewable from an angle that is substantially along the plane of the container 12 or the frame 14 could be arranged around the container 12 so that it is able to exhibit the reference indicia 22 along the plane of the container 12 and still leave at least a portion of the container 12 visible so that the first indicator 18 and/or second indicator 20 is viewable through the container 12.

The container 12 need not necessarily follow the arc of a circle, however this arrangement is preferable. Indeed, the container 12 may take on other non-linear (i.e. curved) configurations. Non-linear arrangements prevent the container acting like a standard spirit level where the indicator would travel unimpeded to one of the ends of the container for any inclination, thus providing no useful information other than indicating the presence of an inclination. Examples of non-linear, non-circular paths that the container 12 may follow include, but are not limited to, elliptical and hyperbolic formations. Useful reference indicia 22 can be applied to the measurement device 10 that has been calibrated or otherwise calculated to indicate the desired angle-related properties by reference to the position of the first indicator 18 and/or second indicator 20.

The container 12 preferably extends along the arc of a circle that subtends an angle greater than 180°. The benefit of this arrangement can be appreciated by considering a measurement device 10 having a container 12 that extends along the arc of a circle that subtends an angle of 180°. In this arrangement, if the device 10 was held so that the flat edge 14a of the frame is aligned vertically (along direction g), the first indicator 18 and second indicator 20 would be disposed at (opposite) ends of the container 12. Because the first indicator 18 and second indicator 20 are not point elements but finite in size, there will be little difference, if any, in the position of at least one of the first indicator 18 and second indicator 20 relative to the reference indicia 22 compared with a position in which the device 10 is rotated by a small amount, such as 1° or 2°, for example. Therefore, by providing a container 12 that extends along an arc of a circle that subtends an angle greater than 180°, more accurate measurements are possible for orientations around absolute vertical and absolute horizontal. The container 12 preferably extends along an arc of a circle that subtends an angle less than 360° so that the container 12 can terminate at flat ends 12a providing a flat edge that can be disposed on a surface to be measured.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A measurement device comprising:
   a curved container containing, the curved container following a circular path, wherein the circular path extends along an arc, and
   a liquid, and
   a first indicator that is less dense than the liquid, and
   a second indicator that is more dense than the liquid, where the liquid substantially fills the curved container;
   wherein the first indicator is free to move in the liquid to its highest local point relative to the gravitational vertical axis as determined by the confines of the container, and the second indicator is free to move in the liquid towards its lowest local point relative to the gravitational vertical axis as determined by the confines of the container;
   and wherein the measurement device further comprises reference indicia arranged relative to the container so that the position of the first indicator and/or second indicator in the container relative to the reference indicia may indicate an angle-related property of the device.

2. The measurement device as claimed in claim 1, wherein the circular path extends along an arc subtending an angle greater than 180°.

3. The measurement device as claimed in claim 1, wherein the circular path extends along an arc subtending an angle less than 360°.

4. The measurement device as claimed in claim 1, wherein the circular path extends along an arc subtending an angle between 180° and 200°.

5. The measurement device of claim 1, wherein the reference indicia are arranged on the container.

6. The measurement device of claim 1, further comprising a frame wherein the curved container is attachable to the frame.

7. The measurement device as claimed in claim 6, wherein the reference indicia are arranged on the frame.

8. The measurement device as claimed in claim 7, wherein the frame and the reference indicia are arranged so that the reference indicia are viewable from an angle that is substantially along the plane of the container.

9. The measurement device as claimed in claim 6, wherein the curved container is attachable to the frame by a snap fit or adhesive arrangement.

10. The measurement device as claimed of claim 1, wherein the first indicator is a gas.

11. The measurement device of claim 1, wherein the second indicator is a solid.

12. The measurement device of claim 1, wherein the second indicator is a liquid.

13. A kit comprising:
    a curved container containing a liquid, a first indicator that is less dense than the liquid, and a second indicator that is more dense than the liquid, where the liquid substantially fills the container, wherein the first indicator is free to move in the liquid to its highest local point relative to the gravitational vertical axis as determined by the confines of the container, and the second indicator is free to move in the liquid towards its lowest local point relative to the gravitational vertical axis as determined by the confines of the container; and a plurality of frames, wherein the container is removably attachable to each of the plurality of frames;

wherein each of the plurality of frames includes reference indicia so that when each of the frames is individually attached to curved container, the reference indicia are arranged relative to the container so that the position of the first indicator and/or second indicator in the container relative the reference indicia may indicate an angle-related property of the container.

* * * * *